United States Patent [19]
Borst

[11] 3,877,911
[45] Apr. 15, 1975

[54] METHOD AND APPARATUS FOR PRODUCING FIBERS

[75] Inventor: John A. Borst, San Jose, Calif.

[73] Assignee: Owens-Corning Fiberglas Corporation, Toledo, Ohio

[22] Filed: Sept. 13, 1972

[21] Appl. No.: 288,614

[52] U.S. Cl. ................................ 65/3; 65/6; 65/14
[51] Int. Cl. ..................... C03b 37/04; C03c 25/02
[58] Field of Search ............................... 65/3, 6, 14

[56] References Cited
UNITED STATES PATENTS

| | | | |
|---|---|---|---|
| 3,347,648 | 10/1967 | Krakauer et al. | 65/3 |
| 3,625,667 | 12/1971 | Pitt | 65/3 |

*Primary Examiner*—Robert L. Lindsay, Jr.
*Attorney, Agent, or Firm*—Carl G. Staelin; John W. Overman; Allen D. Gutchess, Jr.

[57] ABSTRACT

A method and apparatus for producing glass fibers are provided in which the fibers are cooled after forming, prior to a binder being applied. The fibers are formed by means of a rotary spinner from which streams of molten glass are ejected and subsequently attenuated into fibers and formed into a downwardly moving veil or tube of fibers by a high velocity blast of hot gases directed around the face of the spinner. The veil or tube of fibers is then moved in an oscillatory manner by a tubular member or lapper to aid in subsequently distributing the fibers on a conveyor belt. Below the lapper and supported thereby is a manifold with a plurality of inwardly-directed nozzles communicating therewith which direct streams of coolant toward the veil of fibers. Below the coolant manifold and nozzles is another manifold and nozzles through which binder is applied to the veil of fibers after being cooled. This binder apparatus is also mounted on the lapper and movable therewith. The inwardly-directed streams of coolant are supplied with sufficient energy to penetrate the veil of fibers and thereby cause cooling of the veil from both the outside and the inside.

2 Claims, 6 Drawing Figures

Fig.1

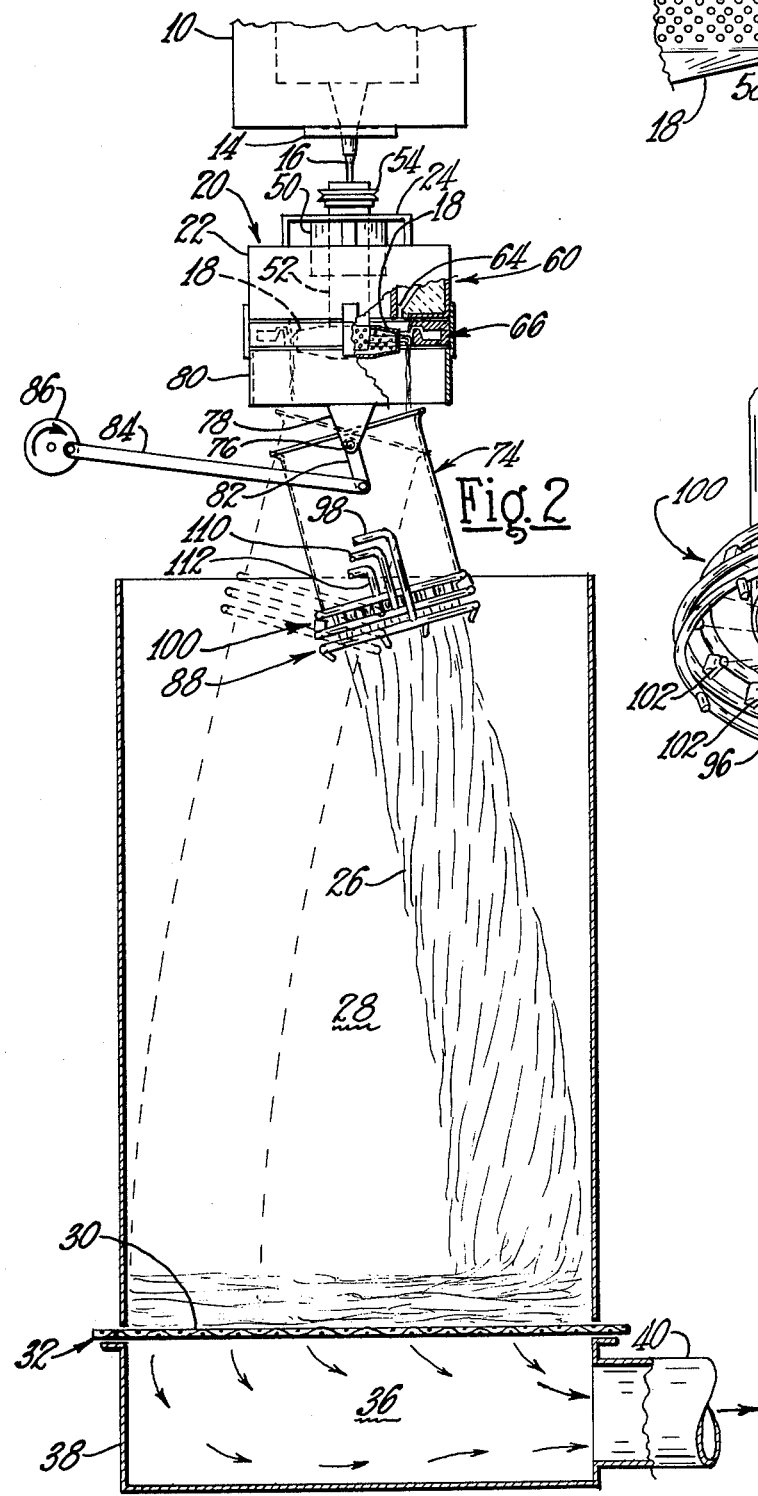

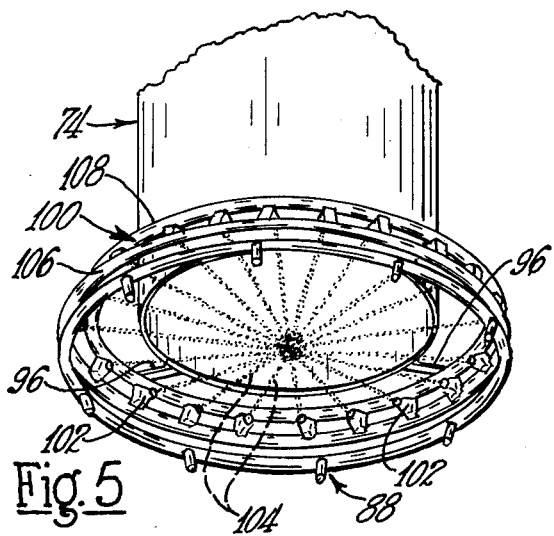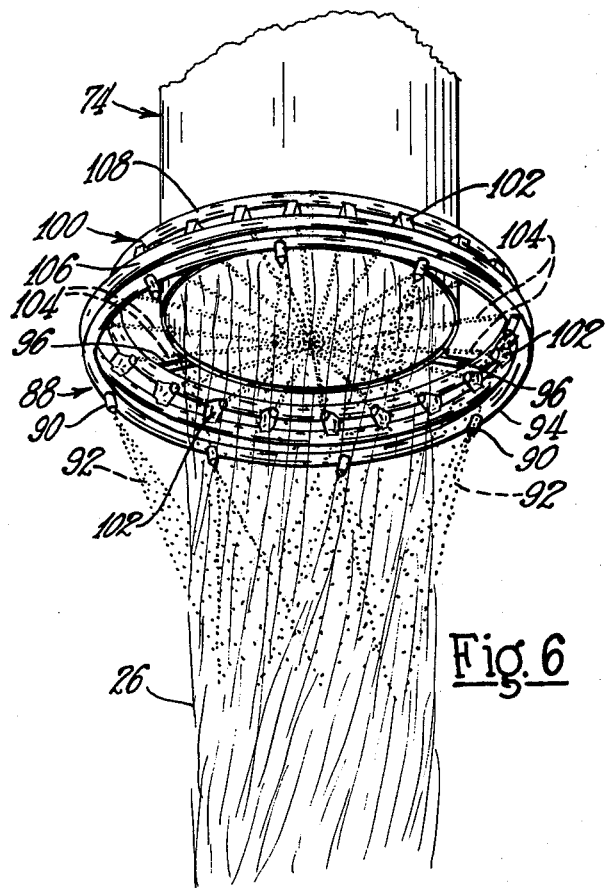

METHOD AND APPARATUS FOR PRODUCING FIBERS

The invention relates to a method and apparatus for producing fibers and more specifically to such a method and apparatus which include cooling the fibers prior to the application of a binder thereto.

Fibers of glass or other heat-softenable materials are commonly made by a rotary process in which the heat-softened material or molten glass is supplied to a hollow spinner or rotatable member having a large number of orifices in a peripheral wall thereof. The spinner is rotated at high speed to cause the molten glass to be delivered to the orifices by centrifugal force to form streams or primary filaments of glass. An annular combustion chamber is located around the spinner to provide an annular high velocity gaseous blast which attenuates the streams into fibers and forms them into a veil of fibers directed away from the spinner.

An uncured binder, such as phenolformaldehyde, is applied to the veil of fibers at a region spaced from the attenuating region to thoroughly coat the fibers with the uncured binder. The fibers are collected in a layer upon a moving conveyor, the layer of fibers then being conveyed through an oven or curing zone for setting or curing the binder. In many installations, the veil of fibers is directed through a tubular member or lapper located above the conveyor, which lapper oscillates transversely of the path of the veil of fibers and directs the veil back and forth over the conveyor, the width of which may substantially exceed the diameter of the veil.

The fibers in the veil in the attenuating region can be at a temperature of 800°–950°F. and still be at a temperature of 500°–600°F. in the region in which the binder is applied. At such temperatures, excessive volatilization of the organic chemicals in the binder occurs with some of the volatilized materials being discharged into the atmosphere through an exhaust system communicating with the fiber-forming apparatus. This results in a waste of the binder and a pollution problem. Further, the binder tends to be partially polymerized or cured, which inhibits uniform distribution of the binder on the fibers.

In accordance with the invention, a coolant is directed toward the veil of fibers prior to the application of the binder to reduce the fiber temperature to 200°–250°F., which is sufficiently low to substantially prevent volatilization of the binder and partial curing thereof. Less waste of the binder occurs, less pollution results, and more uniform distribution of the binder on the fibers is achieved.

More specifically in accordance with the invention, the veil of fibers is cooled after passing through the lapper and immediately before the binder is applied. By cooling the veil below the lapper, there is no possibility for the water or other coolant to wet the lapper and cause the fibers to "hang up" therein. Further, if the coolant is applied above the lapper, adjacent the spinner, care must be taken to prevent excessive cooling of the spinner wall. In addition, with no water being on the fibers as they extend through the lapper, less inertial load results therefrom on the lapper drive. The cooling nozzles are also more readily accessible and visible being below the lapper. The chance of the fibers being caught or hanging up on the cooling nozzles is also reduced.

Heretofore, the coolant has been applied by fine sprays which are designed to volatilize at the veil and prevent actual wetting of the fibers. Further, the gentle spray of water was intended not to disturb the veil or the movement of the fibers. It was also thought that when in the form of fine-particle sprays, the coolant was a more effective medium for cooling the fibers.

In contrast to the above, and in accordance with the invention, it has been found that cooling can be substantially increased by directing coolant streams toward the veil of fibers from the outside thereof with sufficient force to penetrate the veil. In this manner, the coolant is effective to cool the fibers from both inside and outside the veil, thereby substantially increasing the cooling rate thereof. Increased cooling is also achieved because the coolant can be supplied at a higher rate. Particularly, by applying the coolant below the lapper, there is no problem with wetting of the lapper even if the fibers are wetted. Also even though the fibers may be wetted, this does not inhibit the application of the binder and uniform distribution thereof. Further, the penetration of the streams of water, contrary to expectation, does not appear to disturb the pattern of the veil or the fibers thereof.

It is, therefore, a principal object of the invention, in the formation of fibers, to cool the fibers to a temperature at which an organic binder may be delivered onto them with minimum volatilization of the binder constituents, to reduce binder waste and contamination of the atmosphere.

Another object of the invention, in the formation of fibers, is to cool the fibers after they have been directed from a lineal path into a oscillatory path and before binder is applied.

Still another object of the invention is to cool fibers formed from heat-softenable material after they are directed through an oscillating tubular member and immediately before binder is applied to the fibers.

A further object of the invention is to cool a veil of fibers made of a heat-softenable material by applying coolant in a manner to effect cooling of the veil from both outside and inside thereof.

Still a further object of the invention is to cool a veil of newly-formed fibers of heat-softenable material by directing a plurality of streams of coolant toward the veil from outside locations and sufficient energy to penetrate the veil.

Other objects and advantages of the invention will be apparent from the following detailed description of preferred embodiments thereof, reference being made to the accompanying drawings, in which:

FIG. 2 is a view in transverse cross section taken along the line 2—2 of FIG. 1, and illustrating one arrangement for distributing the attenuated fibers;

FIG. 3 is an enlarged, fragmentary view in vertical cross section of the fiber-forming apparatus of FIGS. 1 and 2;

FIG. 4 is a view in perspective of apparatus for cooling a veil of the fibers in accordance with the invention;

FIG. 5 is a view similar to FIG. 4 of the apparatus operating under slightly different conditions; and FIG. 6 is a view similar to FIG. 5 but also showing binder streams being directed toward the veil of fibers.

Figure 1:
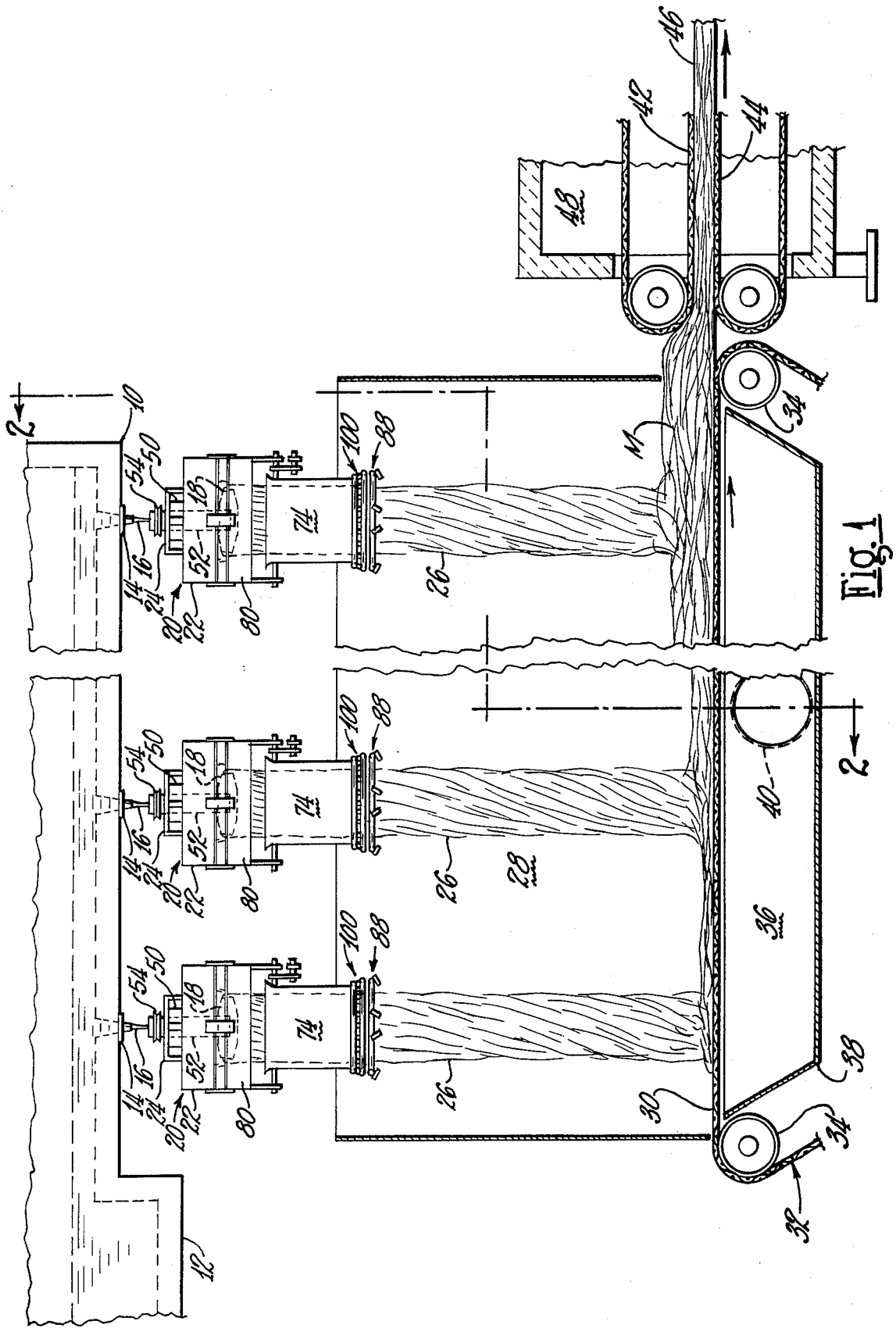
FIG. 1 is a fragmentary side view in elevation of a plurality of fiber-forming units and fiber-distributing means, with apparatus for collecting the fibers being shown in cross section.

While the method and apparatus according to the invention are illustrated with fiber-forming units in which streams of primary filaments of heat-softenable material, such as glass, are centrifuged from a spinner and engaged by high velocity, hot gases to attenuate the streams in the fibers, it is to be understood that the invention can be used with other forms of fiber-attenuating apparatus and for fibers formed of other heat-softenable materials.

Referring particularly to FIGS. 1 and 2, a portion of a forehearth 10 receives heat-softened glass or other flowable, fiber-forming material from a melting furnace 12 of known design, wherein a raw material or batch is reduced to a flowable or molten state. Feeders 14 are arranged lengthwise of the forehearth 10 in spaced relationship with each feeder providing an orifice through which a stream 16 of glass flows into a hollow rotatable member or spinner 18 of each of a number of fiber-forming units 20. Any number of these units can be employed, depending upon the size or thickness or density of the mass or layer of fibers desired.

The fiber-forming units 20 are located beneath the forehearth 10 upon suitable supporting framework (not shown). Each of the units includes a circular housing 22 mounted on a bracket 24 which in turn can be mounted on the aforesaid framework. Fibers from each of the forming units are directed in a path away from the spinner 18 in the form of a tubular shape or veil 26. The veils are directed downwardly into a chamber or forming hood 28 and onto an upper flight 30 of a foraminous or reticulated endless belt conveyor 32 and the fibers are collected in a mass or layer M and carried along the conveyor 32 toward the right, as shown, the conveyor being supported on rollers 34. Disposed beneath the upper flight 30 of the conveyor 32, in communication with the chamber 28, is a suction chamber 36 defined by a receptacle 38. The chamber 36 is connected by an exhaust pipe 40 with a suction blower (not shown) for establishing a reduced pressure in the chamber 36. The reduced pressure or suction assists in the collection of the fibers on the conveyor flight 30 and also carries the spent gases of the attenuating blast and organic particulates from the binder through the pipe 40 to a suitable vent stack (not shown) and, hence, to the atmosphere.

The mass M of fibers is advanced to a region between upper and lower foraminous belts 42 and 44 which are positioned to compress the fibers into a mat or fibrous body 46 of desired thickness. The foraminous belts 42 and 44 convey the mat of fibers through an oven or heating chamber 48 in which the binder is set or cured on the fibers by the application of heat, in a known manner. During the binder curing or setting step, the mat of fibers is maintained under compression by the belts 42 and 44 so that upon curing of the binder, the fibers are bonded permanently into the mat form.

Each of the fiber-forming units 20 has a housing 50 at an upper portion which rotatably supports a tubular shaft or quill 52, at the lower end of which the spinner 18 is located (FIG. 3). A sheave or pulley 54 at the upper end of the quill is driven by suitable means to rotate the spinner 18. The molten glass is supplied through the quill 52 into the spinner 18 from which it is ejected into streams by centrifugal force through holes or perforations 56 located in a peripheral wall 58 of the spinner. The streams or primary filaments of glass are then contacted and attenuated by hot, high velocity gases which also direct the attenuated fibers downwardly, away from the spinner 18, in the form of the veil or tube 26. To produce these hot gases, a burner 60 with an annular combustion chamber 62 is located above and around the spinner with an annular throat 64 directed downwardly along the exterior surface of the peripheral wall 58 of the spinner to maintain the streams of glass in the softened condition for attenuation.

A blower 66 also is located adjacent and below the burner 60 and has a manifold or chamber 68 to which is supplied compressed air or steam from a pipe 70 controlled by a valve 72. The fluid is emitted through a plurality of circumferentially disposed slots 73 through which the fluid is delivered in a downward direction as an annular, high velocity blast into engagement with the primary filaments of glass projected from the spinner 18.

In most rotary, fiber-forming installations, the diameter of the veil 26 is substantially less than the width of the conveyor belt 30. Consequently, it is necessary to direct the veil 26 of fibers back and forth over the belt to provide the uniform mass M. To accomplish this, a tubular, fiber-distributing member or lapper 74 is mounted below the spinner 18 in the lineal path of the veil 26. The lapper 74 has pins or shafts 76 which are pivotally journaled in brackets 78 which depend from a slug guard 80. With this pivotal arrangement, the upper end of the lapper 74 is always located in the path of the fiber veil 26 to receive the veil. The lower end of the lapper is substantially spaced from the pivot points and directs the veil back and forth from edge to edge of the conveyor 32 when the lapper is oscillated or moved transversely to the path of the veil above the lapper. The lapper is oscillated in this instance by means of an arm 82 affixed to one of the shafts or pins 76, with a link 84 pivotally connected to the end of the arm 82. The opposite end of the link is connected to a crank member 86 which is driven by a motor (not shown) through a suitable speed-reducing mechanism. The extent of the oscillating movement of the lapper 74 is shown in broken lines in FIG. 2.

The primary filaments or streams of glass delivered by centrifugal force from the spinner 18 are at attenuating temperatures which are usually in a range from 1600° to 2000°F., depending upon the character and composition of the glass and the characteristics and velocity of the hot gases employed for attenuating the glass into the final fibers. The attenuated fibers lose heat rapidly as they move downwardly, having a temperature of 800°–950°F. in the region where they are attenuated, but the temperature of the fibers still is in a range of 500°–600°F. in the region where a binder is applied to the veil 26 below the lapper 74. Binders such as phenolformaldehyde and other similar resinous binders are applied as a liquid solution onto the fibers. At the aforementioned temperatures of the fibers, excessive volatilization of the solvent and organic chemicals in the binder composition results. The volatiles and particulates of binder entrained in the high velocity gases are drawn into the suction chamber 36 and discharged through the vent stack, thereby polluting the atmosphere. The discharged material also produces a visible, cloud-like formation to make the pollution even more evident. A substantial percentage of the binder solids and the vaporized solvent also is wasted in this manner.

As shown, binder-applying apparatus 88 includes a plurality of spray heads or nozzles 90 disposed in an annular pattern around the veil 26 to direct binder spray, indicated by dotted lines 92 in FIG. 6, inwardly and downwardly toward the veil 26. The spray nozzles 90 are positioned so that the sprays overlap some to assure that all portions of the fiber veil 26 will be coated or covered by the spray. However, the nozzles 90 are relatively far apart since their spray patterns are relatively wide. As shown, the sprays are directed downwardly at an angle of about 30°–45° to the axis of the veil emerging from the lapper 74 and contact the veil over a length of roughly 6–18 inches with a binder pressure in a supply manifold 94 in order of 40–60 psi. The binder is supplied to the spray nozzles 90 from the annular manifold 94 which also serves to support and position the spray nozzles 90 around the veil. The manifold 94, in turn, is supported from the bottom or discharge end of the lapper 74 through suitable brackets 96. A flexible supply line, 98 supplies the binder to the manifold 94 from a suitable source (not shown).

In accordance with the present invention, the fibers or filaments are cooled, prior to reaching the region of binder application, to a temperature substantially below the value at which volatilization of the constituents and discharge of organic particulates of the binder normally occur so that these losses are greatly reduced or substantially eliminated. By cooling the fibers first, the tendency for the binder to partially cure or set on the fibers is also substantially eliminated. This enables the binder to remain in a fluid state longer and to be more effectively coated on the fibers and the fiber joints. Lesser pre-cure also results in a better product and faster setting binders can be used, if desired.

Heretofore, cooling of the fibers of the veil has been accomplished close to the spinner and as soon as possible after the filaments or fibers have been attenuated to the final diameter. Apparently, it was thought desirable to cool in this area so that the fibers would have a substantial distance to travel to the binder-applying apparatus. However, by cooling the fibers in the upper region, several disadvantages result. First, the coolant must be carefully applied to the fibers to avoid excessively cooling the spinner, which can be detrimental to its operation and effectiveness in forming the primary filaments or streams of glass. The coolant must also be carefully applied so as to vaporize adjacent the fibers of the veil without actually wetting the fibers. When the coolant is applied excessively so as to wet the fibers, they subsequently cause the wetting of the interior of the lapper. When the lapper is wet, subsequently deposited fibers stick to or hang-up in the lapper and may cause a shut-down of the operation or at least cause the stuck fibers to occasionally break loose in chunks or balls and thereby lower the quality of the fiber mass M produced on the conveyor 32. Additionally, with the coolant applied above the lapper, the weight of the fibers is increased and the inertial load of the lapper is correspondingly increased. With the cooling apparatus adjacent the spinner, it is also less visible for determining whether its operation is satisfactory and it is much less accessible for maintenance. The chance of fibers being caught on the cooling apparatus also is increased with its position near the spinner.

In accordance with the invention, the cooling apparatus is employed upstream or above the binder-applying apparatus 88 but below the tubular member or lapper 74. By applying the coolant below the lapper, there is no possibility that excess water will be applied to the fibers which will wet the interior of the lapper and cause the fibers to stick or hang-up. If no water is applied above the lapper, the inertial load on the lapper is correspondingly reduced from that standpoint. There is no problem with the coolant possibly interfering with the operation of the spinner 18 since the cooling means is spaced a substantial distance therefrom. With the cooling apparatus below the lapper 74, the equipment is also easily visible to determine if it is operating properly, and it is readily accessible for maintenance. The possibility of fiber hang-up on the cooling apparatus is also reduced when it is located below the lapper at the discharge end thereof. At this region, there is substantially lower air velocity or turbulence with the fibers correspondingly being directed in the veil 26 in a more definitive path with correspondingly less possibility for stray or errant fibers from catching on the cooling apparatus.

Referring particularly to FIGS. 4 and 5, cooling apparatus suitable for use in accordance with the invention is indicated at 100 and includes a plurality of spray nozzles 102 uniformly positioned around the veil 26 between the discharge end of the lapper 74 and the binder-applying apparatus 88. The nozzles 102 direct streams of water or other suitable coolant, indicated by dotted lines 104, at a slight angle in the direction of movement of the veil 26, this angle being at about 5° to a plane perpendicular to the axis of the veil, by way of example. The nozzles 102 are supported and positioned by annular manifolds 106 and 108 which are also supported from the lapper 74 through the bracket members 96. Water is supplied to the manifold 108 through a flexible line 110 (FIG. 2) and air is supplied to the manifold 108 through a flexible line 112. The streams, as shown in FIG. 4, can be produced by using water at a pressure of 90–120 psi and air at a pressure of 5–15 psi. In such an instance, the streams of water have little atomization and are directed with substantial force or energy so that the streams impinge on the veil 26 and penetrate it with some of the streams impinging on other streams at the center of the veil.

If the same water pressure is used but the air pressure is increased to 16–50 psi, some atomization of the water streams occurs, as shown in FIG. 5, but the force of the streams is still ample to cause them to impinge on and penetrate the veil. Consequently, in both instances, as shown in FIGS. 4 and 5, the coolant is supplied in a manner to penetrate the veil from the outside and to cause cooling of the fibers of the veil from both the outside and the inside. Of course, it is to be clearly understood that the pressures and quantities involved will depend on the specific nozzle designs employed, with the various pressures, quantities, and nozzle designs being almost unlimited. It is only necessary that the water stream have the desired force or kenetic energy necessary to impinge on and penetrate the veil 26 of fibers.

Cooling in accordance with the invention not only increases the cooling rate due to the double face cooling of the fibers, but also because a larger quantity of coolant can be supplied through the stronger streams. For example, water in a quantity of as much as 1½ gallons per minute can be applied to the fibers, in contrast to quantities in the order of three-fourths gallon per minute heretofore achieved when the water was emitted in a fine spray just sufficient to cool the fibers by being vaporized near the surfaces but not sufficient to actually contact and wet out the fibers. The coolant is applied to the fibers at a distance about 12 inches above the binder, which is a sufficient distance for the fibers to be properly cooled prior to the binder being applied. With the fibers of the veil wetted out by the coolant applied in accordance with the invention, the binder actually appears to be better distributed thereover. Further, the forceful contact of the fibrous veil by the coolant stream does not have any deleterious effect on the fibers or the movement of the veil.

Various modifications of the above described embodiments of the invention will be apparent to those skilled in the art, and it is to be understood that such modifications can be made without departing from the scope of the invention, if they are within the spirit and the tenor of the accompanying claims.

I claim:

1. Apparatus for forming fibers from molten mineral material comprising, in combination, a rotatable body, means for supplying molten, fiber-forming material to said body, means for rotating said body to project streams of the material from the body by centrifugal force, means for delivering high velocity gases into engagement with said streams for attenuating the streams into fibers and for directing the fibers away from said body in a veil, a tubular member located in the path of the veil, means for moving said tubular member transversely of the path of the veil to direct the veil in directions transverse to the original path of movement, means positioned near said tubular member at a discharge end away from said rotatable body for supplying coolant toward the veil of fibers when the veil emerges from said tubular member, said coolant supply means including a plurality of nozzles and means for supplying coolant to said nozzles, means connecting said nozzles to said tubular member and positioning said nozzles uniformly around said tubular member and concentric therewith, means for applying heat-curable binder to the veil downstream of said coolant-supplying means, and means connecting said binder-applying means concentrically with the discharge end of said tubular member away from said rotatable body.

2. A method of forming fibers from molten mineral material including delivering molten material to a rotatable body, rotating the body to project streams of the material therefrom by centrifugal force, directing high velocity gases toward the streams of material to attenuate the streams into fibers and to form the fibers into a veil, directing the veil in a path away from said rotatable body, applying transverse forces to the veil to move the veil transversely of the path, subsequently supplying a coolant in a plurality of streams toward the center of the veil of fibers after being diverted from the path, and applying heat-curable binder to the veil after supplying the coolant to the veil.

* * * * *